(12) United States Patent
Nakamura et al.

(10) Patent No.: US 8,023,005 B2
(45) Date of Patent: Sep. 20, 2011

(54) IMAGE RECORDING APPARATUS AND IMAGE RECORDING METHOD

(75) Inventors: Satoshi Nakamura, Miyagi (JP); Mikio Watanabe, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 561 days.

(21) Appl. No.: 12/132,393

(22) Filed: Jun. 3, 2008

(65) Prior Publication Data
US 2008/0309782 A1 Dec. 18, 2008

(30) Foreign Application Priority Data
Jun. 11, 2007 (JP) ................................ 2007-153944

(51) Int. Cl.
*H04N 5/76* (2006.01)
(52) U.S. Cl. ................ 348/231.2; 348/231.6; 348/231.9
(58) Field of Classification Search .................. 707/681, 707/682, 678, 686, 821
See application file for complete search history.

(56) References Cited

U.S. PATENT DOCUMENTS

| | | | |
|---|---|---|---|
| 5,724,579 A | 3/1998 | Suzuki | |
| 7,075,570 B2 * | 7/2006 | Nagaoka | 348/231.2 |
| 7,502,055 B2 * | 3/2009 | Jeon et al. | 348/231.2 |
| 2005/0021497 A1 * | 1/2005 | Kohno | 707/1 |
| 2005/0052548 A1 * | 3/2005 | Delaney | 348/231.2 |
| 2007/0041030 A1 | 2/2007 | Kojima | |
| 2007/0100905 A1 * | 5/2007 | Masters et al. | 707/201 |
| 2007/0283234 A1 | 12/2007 | Hung | |

FOREIGN PATENT DOCUMENTS

| | | |
|---|---|---|
| CN | 1917616 A | 2/2007 |
| JP | 7-245723 A | 9/1995 |
| JP | 11-266420 A | 9/1999 |
| JP | 2003-264776 A | 9/2003 |
| JP | 2004-274091 A | 9/2004 |
| JP | 2005-229291 A | 8/2005 |
| WO | 2005/114664 A1 | 12/2005 |

* cited by examiner

*Primary Examiner* — Luong T Nguyen
(74) *Attorney, Agent, or Firm* — Birch, Stewart, Kolasch & Birch, LLP.

(57) ABSTRACT

An aspect of the present invention provides an image recording apparatus comprising: an image recording device which records an extended image file storing a plurality of pieces of image data and a basic file storing at least one piece of image data selected from the pieces of image data stored in the extended image file, the extended image file and the basic file being associated with each other; a determination device which determines whether or not the basic file has been deleted or modified; and a basic file recovery device which recovers the basic file from the extended image file if it is determined that the basic file has been deleted or modified.

12 Claims, 11 Drawing Sheets

MAIN = 3 :VIEWPOINT NUMBER OF REPRESENTATIVE IMAGE
FORMAT = JPEG :FORMAT OF VIEWPOINT IMAGES
ORDER = D1, 1, 2, 3, 4, 5 :STORAGE ORDER OF IMAGES

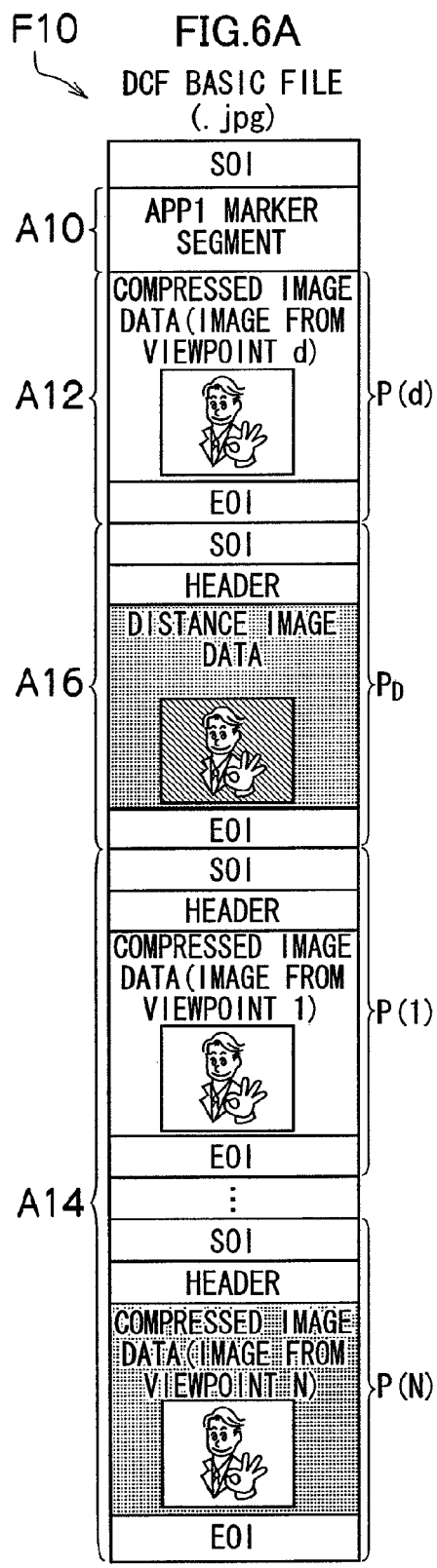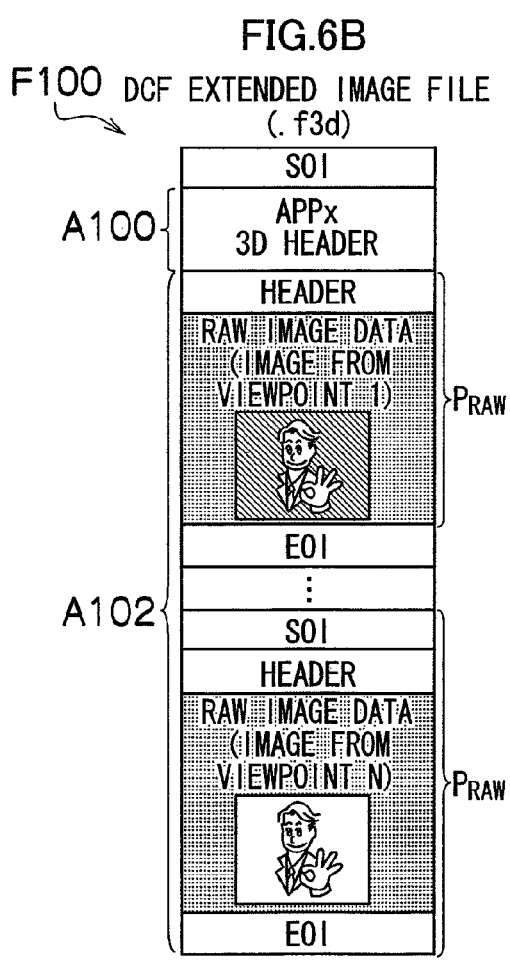
FIG.6A — F10 DCF BASIC FILE (.jpg)
FIG.6B — F100 DCF EXTENDED IMAGE FILE (.f3d)

MAIN = 3 : VIEWPOINT NUMBER OF REPRESENTATIVE IMAGE
FORMAT = JPEG : FORMAT OF VIEWPOINT IMAGES
DepthMapIOrigin = 2, 3 : SOURCE OF DISTANCE IMAGE 1
ORDER = D1, 1, 2, 3, 4, 5 : STORAGE ORDER OF IMAGES

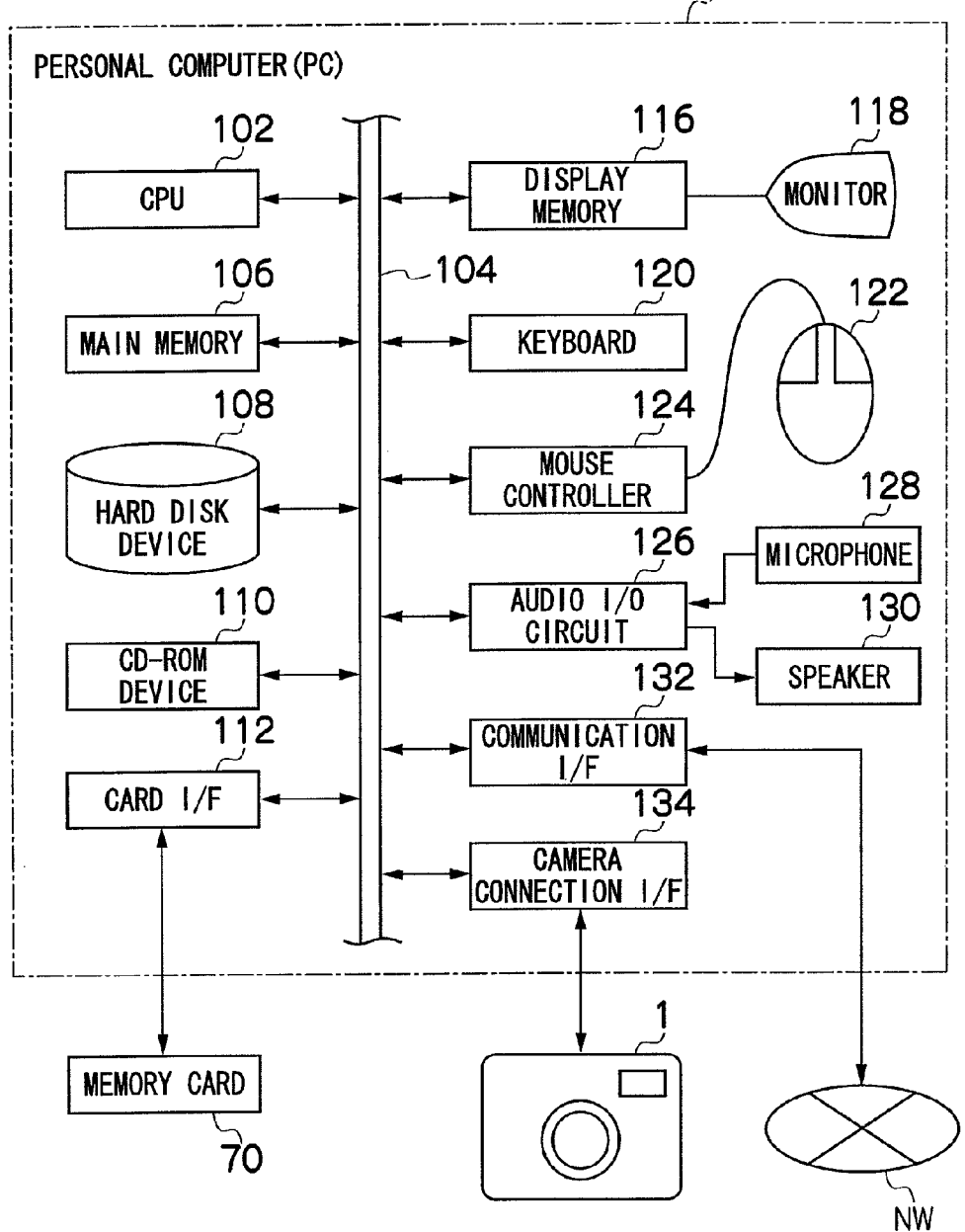

IMAGE RECORDING APPARATUS AND IMAGE RECORDING METHOD

BACKGROUND OF THE INVENTION

1. Field of the Invention

The present invention relates to image recording apparatuses and image recording methods, and more particularly to an image recording apparatus and image recording method in which a plurality of pieces of image data are recorded by storing them in a single image file.

2. Description of the Related Art

Japanese Patent Application Laid-Open No. 11-266420 (FIG. 4) discloses an image data recording method that records a plurality of continuous still images in such a manner that compressed data on the continuous still images generated in one recording operation forms a unit made up of independent compressed data pieces of the still images.

Japanese Patent Application Laid-Open No. 2004-274091 (FIG. 9) discloses an image data generation apparatus that generates image data from images from a plurality of viewpoints, wherein file headers for the images from the plurality of viewpoints and image information are combined into a single file in an existing format.

Japanese Patent Application Laid-Open No. 2005-229291 (Paragraph [0125], FIG. 7) discloses an image recording apparatus that saves 3D image data by generating a new folder and saving the 3D image data, right-eye image data, and left-eye image data together in that folder.

If an image file containing a plurality of concatenated pieces of image data is given a special extension different from those for conventional standard image files, the image file cannot be recognized as an image file by image processing apparatuses and image processing applications that do not support that extension. Therefore, to such an image file, it may be possible to give an extension for conventional standard image files (an extension corresponding to the encoding format of the pieces of image data included in the image file, e.g., JPG) so that the image file can be recognized as an image file by conventional image processing apparatuses and so on. Thus, even in an image processing apparatus having no function of reading a plurality of pieces of image data from an image file in which a plurality of pieces of image data are stored and performing processing such as reproducing, the image file can be treated in the same manner as a standard image file. Therefore, at least the first one of the pieces of image data in the image file can be read.

SUMMARY OF THE INVENTION

The inventors of the present invention studied conventional technique and have found a problem in it. Specifically, in the conventional technique, there is a problem that in saving the read piece of image data after editing it by such an image processing apparatus, the second and following pieces of image data in the original image file are not saved in a new saved image file. This is problematic in that the overwrite-saving causes deletion of the second and following pieces of image data in the original image file.

Japanese Patent Application Laid-Open No. 11-266420 and Japanese Patent Application Laid-Open No. 2004-274091 are not intended to solve this problem. Japanese Patent Application Laid-Open No. 2005-229291, which involves storing the right-eye image data and the left-eye image data along with the 3D image data, is not intended to solve the problem of deletion of one of the right-eye image data and the left-eye image data when one of them is edited.

The present invention has been made in consideration of the above situation, and it is an object of the present invention to provide an image recording apparatus and image recording method for generating and recording a single image file having a plurality of pieces of image data stored therein, wherein the image file can be recorded in a format available even in an image processing apparatus having no function of reading a plurality of pieces of image data from the image file, and wherein an image data loss due to modification of the image file in the image processing apparatus can be avoided.

To solve the above problem, an image recording apparatus according to a first aspect of the present invention comprises: an image recording device which records an extended image file storing a plurality of pieces of image data and a basic file storing at least one piece of image data selected from the pieces of image data stored in the extended image file, the extended image file and the basic file being associated with each other; a determination device which determines whether or not the basic file has been deleted or modified; and a basic file recovery device which recovers the basic file from the extended image file if it is determined that the basic file has been deleted or modified.

According to the first aspect of the present invention, images can be recorded in the basic file that is in a format readable even in an image processing apparatus having no function of reading a plurality of pieces of image data from the extended image file in which a plurality of concatenated pieces of image data are stored and playing or editing the read pieces of image data. Further, according to the first aspect of the present invention, the basic file can be recovered using representative image data in the extended image file if the basic file has been deleted or modified. Therefore, unmodified representative image data can always be provided to other image processing apparatuses.

In a second aspect of the present invention, the image recording apparatus according to the first aspect is characterized in that the image recording device records the basic file with a standard image-file extension attached to the basic file.

According to the second aspect of the present invention, because the extension for the basic file is a standard image-file extension (e.g., JPG, TIFF, BMP, GIF, or PNG), the basic file can be read even in an image processing apparatus having no function of reading a plurality of pieces of image data from an image file in which a plurality of concatenated pieces of image data are stored and playing or editing the read pieces of image data.

In a third aspect of the present invention, the image recording apparatus according to the first or second aspect is characterized in that the image recording device records basic file related information necessary for recovering the basic file in the extended image file, and the basic file recovery device recovers the basic file according to the basic file related information.

According to the third aspect of the present invention, the basic file can be recovered using the basic file related information recorded in the extended image file.

In a fourth aspect of the present invention, the image recording apparatus according to the third aspects is characterized in that the image recording device records raw data of the pieces of image data in the extended image file, and the basic file recovery device recovers pieces of image data to be stored in the basic file by encoding pieces of raw data designated in the basic file related information, among the pieces of raw data stored in the extended image file, into an encoding format specified in the basic file related information.

According to the fourth aspect of the present invention, raw data necessary for generating image data to be stored in the basic file can be stored in the extended image file.

An image recording method according to a fifth aspect of the present invention comprises: an image recording step of recording an extended image file storing a plurality of pieces of image data and a basic file storing at least one piece of image data selected from the pieces of image data stored in the extended image file, the extended image file and the basic file being associated with each other; a determination step of determining whether or not the basic file has been deleted or modified; and a basic file recovery step of recovering the basic file from the extended image file if it is determined that the basic file has been deleted or modified.

In a sixth aspect of the present invention, the image recording method according to the fifth aspect is characterized in that, in the image recording step, the basic file is recorded with a standard image-file extension attached to the basic file.

In a seventh aspect of the present invention, the image recording method according to the fifth or sixth aspect further comprises the steps of: recording basic file related information necessary for recovering the basic file in the extended image file; and recovering the basic file according to the basic file related information.

In an eighth aspect of the present invention, the image recording method according to the seventh aspects is characterized in that, in the image recording step, raw data of the pieces of image data are recorded in the extended image file, and the basic file recovery step includes the step of recovering pieces of image data to be stored in the basic file by encoding pieces of raw data designated in the basic file related information, among the pieces of raw data stored in the extended image file, into an encoding format specified in the basic file related information.

According to the present invention, images can be recorded in the basic file that is in a format readable even in an image processing apparatus having no function of reading a plurality of pieces of image data from the extended image file in which a plurality of concatenated pieces of image data are stored and playing or editing the read pieces of image data. Further, according to the first aspect of the present invention, the basic file can be recovered using representative image data in the extended image file if the basic file has been deleted or modified. Therefore, unmodified representative image data can always be provided to other image processing apparatuses.

BRIEF DESCRIPTION OF THE DRAWINGS

FIG. 5 is a diagram showing a basic file related information D10;

FIG. 6A is a diagram schematically showing the data structure of the basic file F10, and FIG. 6B is a diagram schematically showing the data structure of the extended image file F100;

FIG. 7 is a diagram showing the basic file related information D10 in the example of FIG. 6;

FIG. 11 is a block diagram showing the general configuration of the image recording apparatus according to a second embodiment of the present invention.

DETAILED DESCRIPTION OF THE PREFERRED EMBODIMENTS

With reference to the accompanying drawings, preferred embodiments of an image recording apparatus and image recording method according to the present invention will be described below.

First Embodiment

Figure 1:
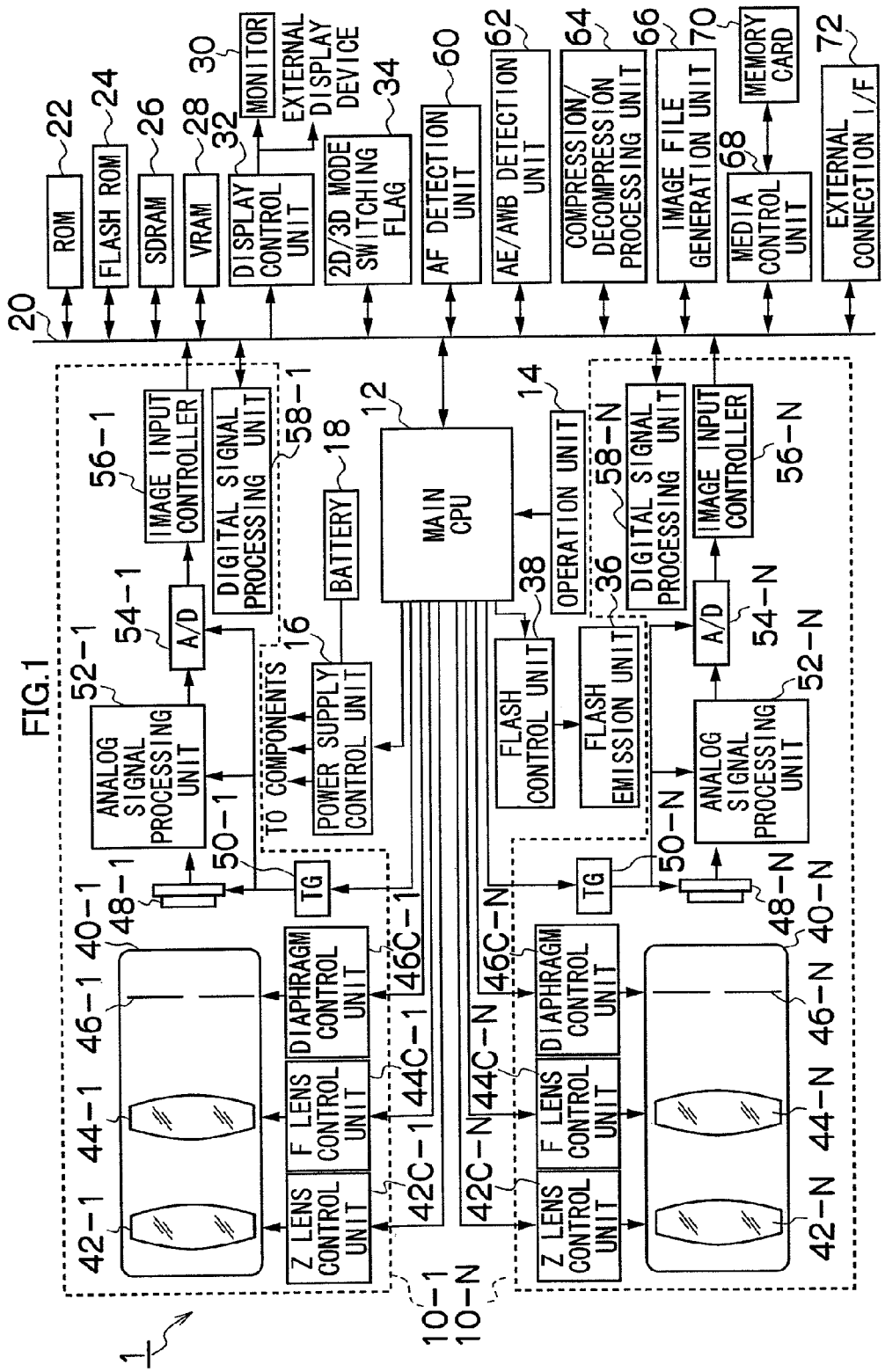
FIG. 1 is a block diagram showing the general configuration of an image taking apparatus that includes an image recording apparatus according to a first embodiment of the present invention.

FIG. 1 is a block diagram showing the general configuration of an image taking apparatus that includes the image recording apparatus according to a first embodiment of the present invention. As shown in FIG. 1, the image taking apparatus 1 includes a plurality of imaging units 10-1, 10-2, . . . , 10-N (N≧2), so that it obtains parallax images of one subject taken from multiple viewpoints and records the images as recording image data in a predetermined format.

A main CPU 12 (hereinafter referred to as a CPU 12) functions as a control device that centrally controls the operation of the entire image taking apparatus 1 according to a predetermined control program based on inputs from an operation unit 14. A power supply control unit 16 controls power from a battery 18 and supplies operating power to components of the image taking apparatus 1.

Connected to the CPU 12 via a bus 20 are a ROM 22, a flash ROM 24, an SDRAM 26, and a VRAM 28. The ROM 22 stores the control program executed by the CPU 12, various kinds of data necessary for control, and so on. The flash ROM 24 stores various kinds of setting information about the operation of the image taking apparatus 1, such as user-set information, and so on.

The SDRAM 26 includes an area used by the CPU 12 to perform operations, and a temporary storage area (work memory) for image data. The VRAM 28 includes a temporary storage area dedicated to image data to be displayed.

A monitor 30 is implemented as, for example, a display device with a color liquid-crystal panel. The monitor 30 is used as an image display unit for displaying shot images, and as a GUI in configuring various settings. The monitor 30 is also used as an electronic view finder for checking the angle of view in a shooting mode.

The monitor 30 can display three-dimensional images (3D images). Exemplary techniques applicable to provide three-dimensional display include an anaglyph method using a pair of special glasses, color anaglyph method, polarizing filter method, and time division 3D television method. A lenticular method is also applicable, in which what are called lenticular lenses including a group of semi-cylindrical lenses are placed on the surface of the monitor 30. It is noted that the techniques for providing three-dimensional display are not limited to those listed above.

A display control unit 32 converts image data read out from imaging elements 48 or a memory card 70 into an image signal for display (e.g., an NTSC signal, PAL signal, or SECAM signal) to output the image signal to the monitor 30, and also outputs predetermined text and graphic information (e.g., data for onscreen display) to the monitor 30. The display control unit 32 can also output images to an external display device connected via a predetermined interface (e.g., USB, IEEE1394, or LAN).

The operation unit 14 includes operational input devices such as a shutter button, a power/mode switch, a mode dial, cross buttons, zoom buttons, a MENU/OK button, a DISP button, and a BACK button.

The power/mode switch functions as a device for switching on and off the power of the image taking apparatus 1, and for switching the operation mode (a reproducing mode and a shooting mode) of the image taking apparatus 1.

The mode dial is an operation device for switching the shooting mode of the image taking apparatus 1. Depending on the setting position of the mode dial, the shooting mode is switched among a 2D still image shooting mode for taking two-dimensional still images, a 2D moving image shooting mode for taking two-dimensional moving images, a 3D still image shooting mode for taking three-dimensional still images, and a 3D moving image shooting mode for taking three-dimensional moving images. When the shooting mode is set to the 2D still image shooting mode or the 2D moving image shooting mode, a flag indicating the 2D mode for taking two-dimensional images is set at a 2D/3D mode switching flag 34. When the shooting mode is set to the 3D still image shooting mode or the 3D moving image shooting mode, a flag indicating the 3D mode for taking three-dimensional images is set at the 2D/3D mode switching flag 34. The CPU 12 refers to the 2D/3D mode switching flag 34 to determine whether the apparatus is in the 2D mode or the 3D mode.

The shutter button is implemented as a two-stroke switch that allows what are called a "half press" and a "full press". In the still image shooting modes, a half press on the shutter button causes pre-shooting processing (i.e., AE (Automatic Exposure), AF (Auto Focus), and AWB (Automatic White Balance)). A full press on the shutter button causes image shooting and recording processing. In the moving image shooting modes, a full press on the shutter button causes moving image shooting to be started. Another full press causes the shooting to be finished. Depending on settings, moving images may be taken while the shutter button is kept full pressed, and the shooting may be finished when the full press is released. A shutter button for still image shooting and a shutter button for moving image shooting may be separately provided.

The cross buttons are provided so that it is operable to be pushed in four directions, i.e., upward, downward, rightward, and leftward. The button in each direction is assigned a function according to the operation mode and so on of the shooting apparatus 1. For example, in the shooting mode, the left button is assigned a function of switching a macro function on and off, and the right button is assigned a function of switching a flash mode. Also in the shooting mode, the upper button is assigned a function of changing the brightness of the monitor 30, and the lower button is assigned a function of switching a self timer on and off. In the reproducing mode, the left button is assigned a frame-by-frame advance reproducing function, and the right button is assigned a frame-by-frame reverse reproducing function. Also in the reproducing mode, the upper button is assigned a function of changing the brightness of the monitor 30, and the lower button is assigned a function of deleting an image being reproduced. In configuration of various settings, each button is assigned a function of moving a cursor displayed on the monitor 30 in the direction of the button.

The zoom buttons are operation devices for performing zooming operation of the imaging units 10-1, 10-2, ..., 10-N. The zoom buttons include a zoom tele button for instructing zooming toward the tele side and a zoom wide button for instructing zooming toward the wide side.

The MENU/OK button is used for invoking a menu screen (a MENU function), and for confirming a selected item, instructing to perform processing, and so on (an OK function). The function assigned is switched depending on the setting state of the image taking apparatus 1. On the menu screen, the MENU/OK button is used to set all adjustment items of the image taking apparatus 1, for example: image quality adjustments such as the exposure value, hue, shooting sensitivity, and the number of recorded pixels; self timer setting; photometric method switching; and whether or not to use digital zoom. The image taking apparatus 1 operates according to the conditions set on the menu screen.

The DISP button is used to input instructions such as to switch the display content on the monitor 30. The BACK button is used to input instructions such as to cancel an input operation.

A flash emission unit 36 is implemented as a discharge tube (xenon tube), for example, and is caused to emit light as necessary in such cases as shooting a shaded subject or shooting in the backlight. A flash control unit 38 includes a main capacitor for supplying a current for causing the flash emission unit (discharge tube) 36 to emit light. Under a flash emission instruction from the CPU 12, the flash control unit 38 controls charging of the main capacitor, the discharge (emission) timing of the flash emission unit 36, the discharge duration, and so on. Other light emission devices such as an LED may also be used as the flash emission unit 36.

Now, the image taking function of the image taking apparatus 1 will be described. The imaging units 10 each include image taking lenses 40 (a zoom lens 42, a focus lens 44, and a diaphragm 46), a zoom lens control unit (Z lens control unit) 42C, a focus lens control unit (F lens control unit) 44C, a diaphragm control unit 46C, an imaging element 48, a timing generator (TG) 50, an analog signal processing unit 52, an A/D converter 54, an image input controller 56, and a digital signal processing unit 58. While the components within the imaging units 10-1, 10-2, ..., 10-N in FIG. 1 are labeled for distinction with symbols 1, 2, ..., N respectively, the symbols 1, 2, ..., N will be omitted in the following description because the function of each component is almost the same in each imaging unit.

The zoom lens 42 is driven by a zoom actuator (not shown) to move back and forth along the optical axis. The CPU 12 performs zooming by controlling the driving of the zoom actuator through the zoom lens control unit 42C to adjust the position of the zoom lens 42.

The focus lens 44 is driven by a focus actuator (not shown) to move back and forth along the optical axis. The CPU 12 performs focusing by controlling the driving of the focus actuator through the focus lens control unit 44C to adjust the position of the focus lens 44.

The diaphragm 46 is implemented as an iris diaphragm, for example, and is driven by a diaphragm actuator (not shown). The CPU 12 controls the amount of incident light into the imaging element 48 by controlling the driving of the diaphragm actuator through the diaphragm control unit 46C to adjust the amount of opening (aperture value) of the diaphragm 46.

The CPU 12 drives the shooting lenses 40-1, 40-2, ..., 40-N of the imaging units synchronously. That is, the image taking lenses 40-1, 40-2, ..., 40-N are always set to the same focusing distance (zoom magnification), so that the focus is adjusted to always bring the same subject into focus. The aperture is also adjusted to always obtain the same amount of incident light (aperture value).

The imaging element 48 is implemented as a color CCD solid-state imaging element, for example. Many photodiodes are two-dimensionally arranged on a light-receiving surface of the imaging element (CCD) 48, and each photodiode has a color filter placed in a predetermined arrangement. An optical image of a subject taken by the image taking lenses 40 onto the light-receiving surface of the CCD is converted by the photodiodes into signal charges corresponding to the amount of incident light. Based on driving pulses provided from the TG 50 under instructions from the CPU 12, the signal charge accumulated in each photodiode is sequentially read out from the imaging element 48 as a voltage signal (image signal) corresponding to the signal charge. The imaging element 48 has an electronic shutter function, so that the exposure duration (shutter speed) is controlled by adjusting the duration for which the charge is accumulated in the photodiode.

Although the CCD is used as the imaging element 48 in this embodiment, imaging elements in other configurations, such as a CMOS sensor, may also be used.

The analog signal processing unit 52 includes a correlated double sampling circuit (CDS) for eliminating reset noises (low frequencies) contained in an image signal output from the imaging element 48, and an AGS circuit for amplifying the image signal to control its magnitude to be at a predetermined level. Thus, the image signal output from the imaging element 48 is subjected to correlated double sampling processing and amplified.

The A/D converter 54 converts the analog image signal output from the analog signal processing unit 52 into a digital image signal.

The image input controller 56 takes the image signal output from the A/D converter 54 and stores the image signal in the SDRAM 26.

The digital signal processing unit 58 functions as an image processing device that includes a synchronization circuit (a processing circuit that performs interpolation for temporal misalignment of color signals due to the color filter arrangement on a single-plate CCD and converts the color signals synchronously), a white balance adjustment circuit, a tone conversion processing circuit (e.g., a gamma correction circuit), an edge correction circuit, a luminance/color difference signal generation circuit, and so on. The digital processing unit 58 performs predetermined signal processing on image signals of R, G, and B stored in the SDRAM 26. That is, in the digital signal processing unit 58, the image signals of R, G, and B are converted into YUV signals made up of a luminance signal (Y signal) and color difference signals (Cr and Cb signals) and subjected to predetermined processing such as tone conversion processing (e.g., gamma correction). The image data processed by the digital signal processing unit 58 is stored in the VRAM 28.

When a taken image is output to the monitor 30, image data is read out from the VRAM 28 and sent to the display control unit 32 via the bus 20. The display control unit 32 converts the input image data into a display video signal of a predetermined scheme and outputs the video signal to the monitor 30.

An AF detection unit 60 takes image signals of the colors R, G, and B taken from any one of the image input controllers 56-1, 56-2, . . . , 56-N and computes a focus evaluation value necessary for AF control. The AF detection unit 60 includes a high-pass filter that passes only high-frequency components of G signals, an absolutization processing unit, a focus area extraction unit that extracts signals within a predetermined focus area that is set on the screen, and an accumulation unit that accumulates absolute value data within the focus area. The AF detection unit 60 outputs the absolute value data within the focus area accumulated by the accumulation unit to the CPU 12 as the focus evaluation value.

In AF control, the CPU 12 brings a main subject into focus by searching for the position where the focus evaluation value output from the AF detection unit 60 is the local maximum and by moving the focus lens 44 to that position. That is, in AF control, the CPU 12 first moves the focus lens 44 from closest focus to infinity. In the process of doing so, the CPU 12 sequentially obtains the focus evaluation value from the AF detection unit 60 and detects the position where the focus evaluation value is the local maximum. The CPU 12 determines that the detected position where the focus evaluation value is the local maximum is the focusing position, and moves the focus lens 44 to that position. In this manner, the subject (main subject) residing in the focus area is brought into focus.

An AE/AWB detection unit 62 takes image signals of the colors R, G, and B taken from any one of the image input controllers 56-1, 56-2, . . . , 56-N and computes a cumulative value necessary for AE control and AWB control. That is, the AE/AWB detection unit 62 divides one screen into a plurality of areas (e.g., 8×8=64 areas) and computes the cumulative value of the R, G, and B signals for each area resulting from the division.

In AE control, the CPU 12 configures exposure settings for obtaining an appropriate amount of exposure. This is done by obtaining a cumulative value of the R, G, and B signals for each area computed by the AE/AWB detection unit 62 and determining the brightness (photometric value) of the subject. That is, the CPU 12 sets the imaging sensitivity, aperture value, shutter speed, and whether or not strobe light emission is necessary.

In AWB control, the CPU 12 inputs the cumulative value of the R, G, and B signals for each area computed by the AE/AWB detection unit 62 to the digital signal processing unit 58. The digital signal processing unit 58 computes a gain value for white-balance adjustment based on the cumulative value computed by the AE/AWB detection unit 62. The digital signal processing unit 58 also detects the type of the light source based on the cumulative value computed by the AE/AWB detection unit 62.

A compression/decompression processing unit 64 performs compression processing on input image data and generates compressed image data in a predetermined format under an instruction from the CPU 12. For example, a still image is subjected to compression processing in compliance with a JPEG standard, and a moving image is subjected to compression processing in compliance with an MPEG-2, MPEG-4, or H.264 standard. The compression/decompression processing unit 64 also performs decompression processing on input compressed image data and generates uncompressed image data under an instruction from the CPU 12.

An image file generation unit 66 generates an extended image file F100 for storing image data taken by the above-described shooting units 10-1, 10-2, . . . , 10-N, and a basic file F10 corresponding to the extended image file F100.

A media control unit 68 controls reading/writing of data from/to the memory card 70 under instructions from the CPU 12.

An external connection interface unit (external connection I/F) 72 is a device for transmitting/receiving data to/from external image processing apparatuses (e.g., a personal computer, mobile information terminal, image storage device, and server). Exemplary techniques applicable to communicate with external image processing apparatuses include USB, IEEE1394, LAN, and infrared communication (IrDA).

[Recording Image Data]

Figure 2:
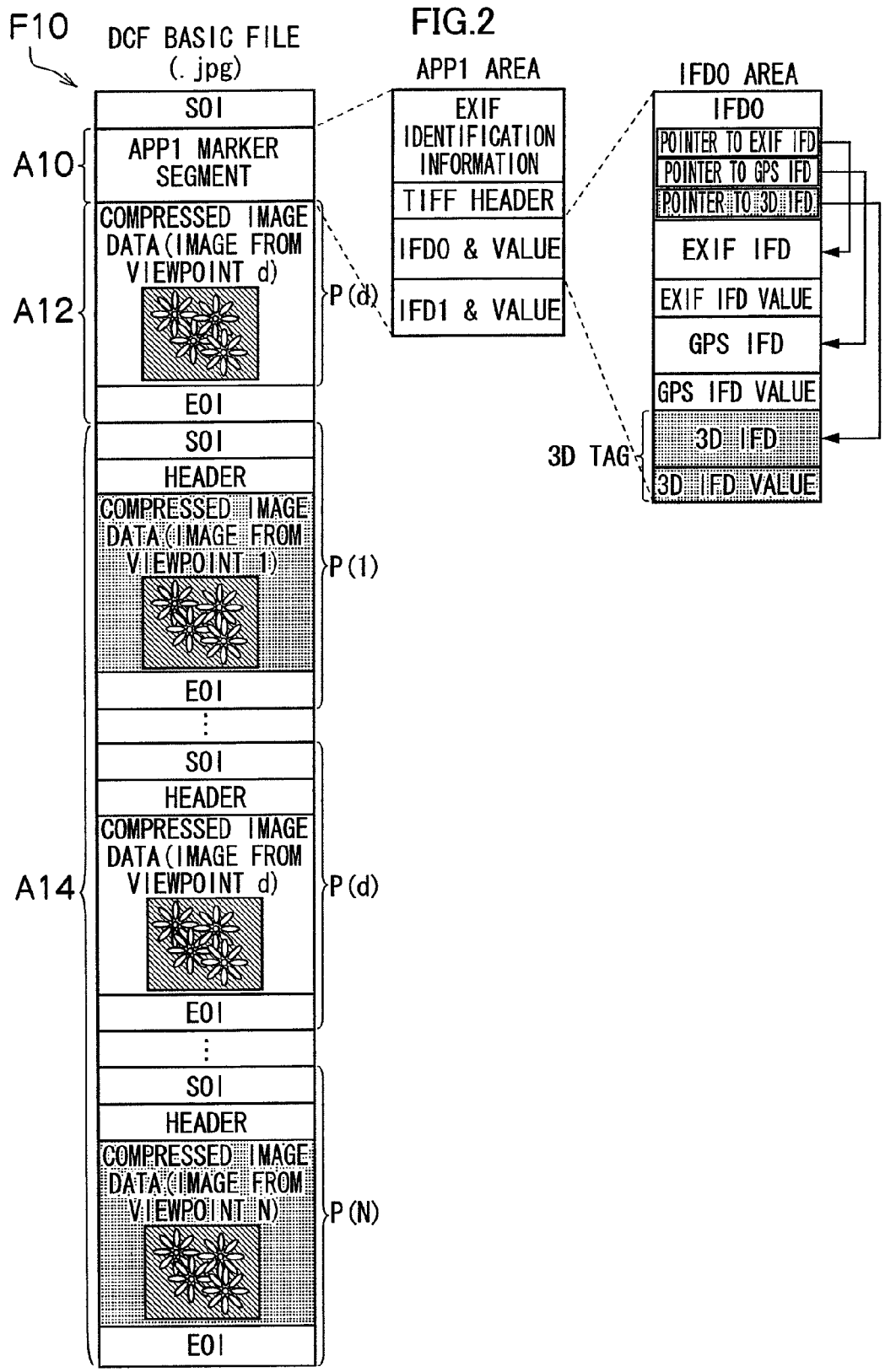
FIG. 2 is a diagram schematically showing the data structure of a basic file F10.
Figure 3:
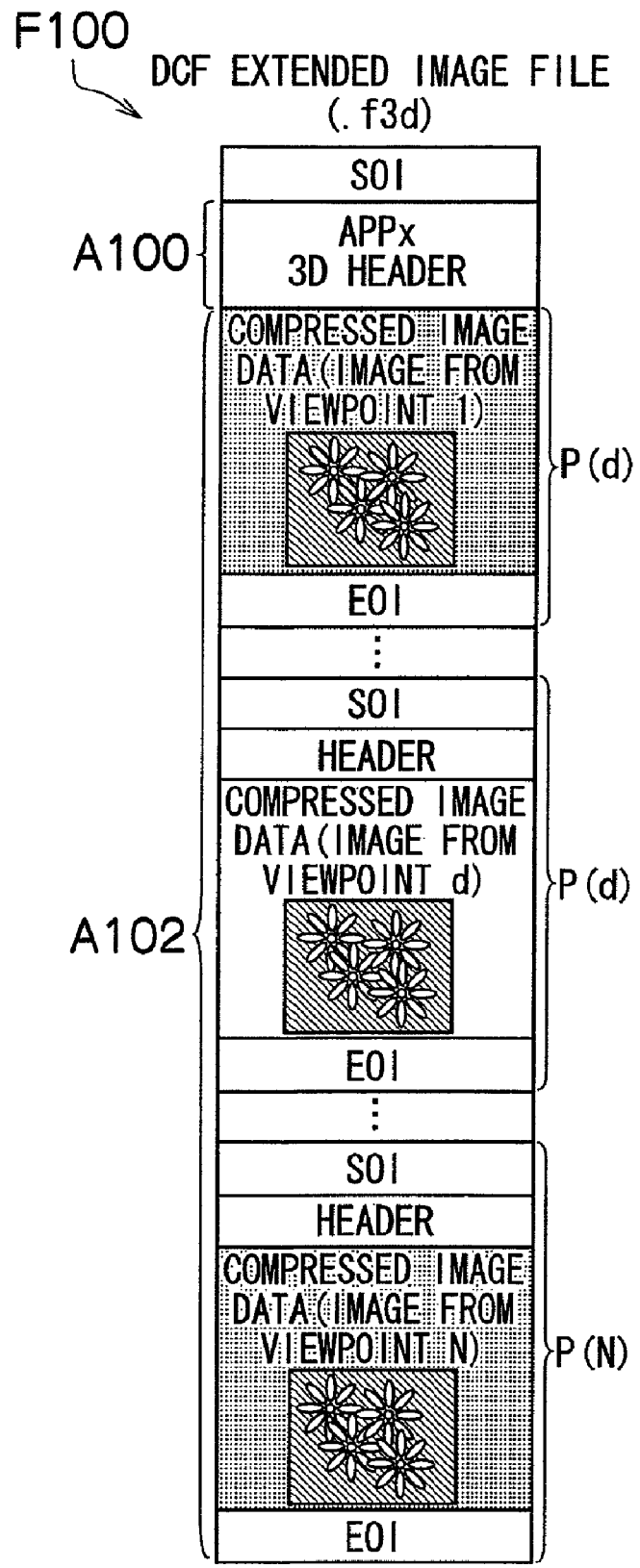
FIG. 3 is a diagram schematically showing the data structure of an extended image file F100.
Figure 4:
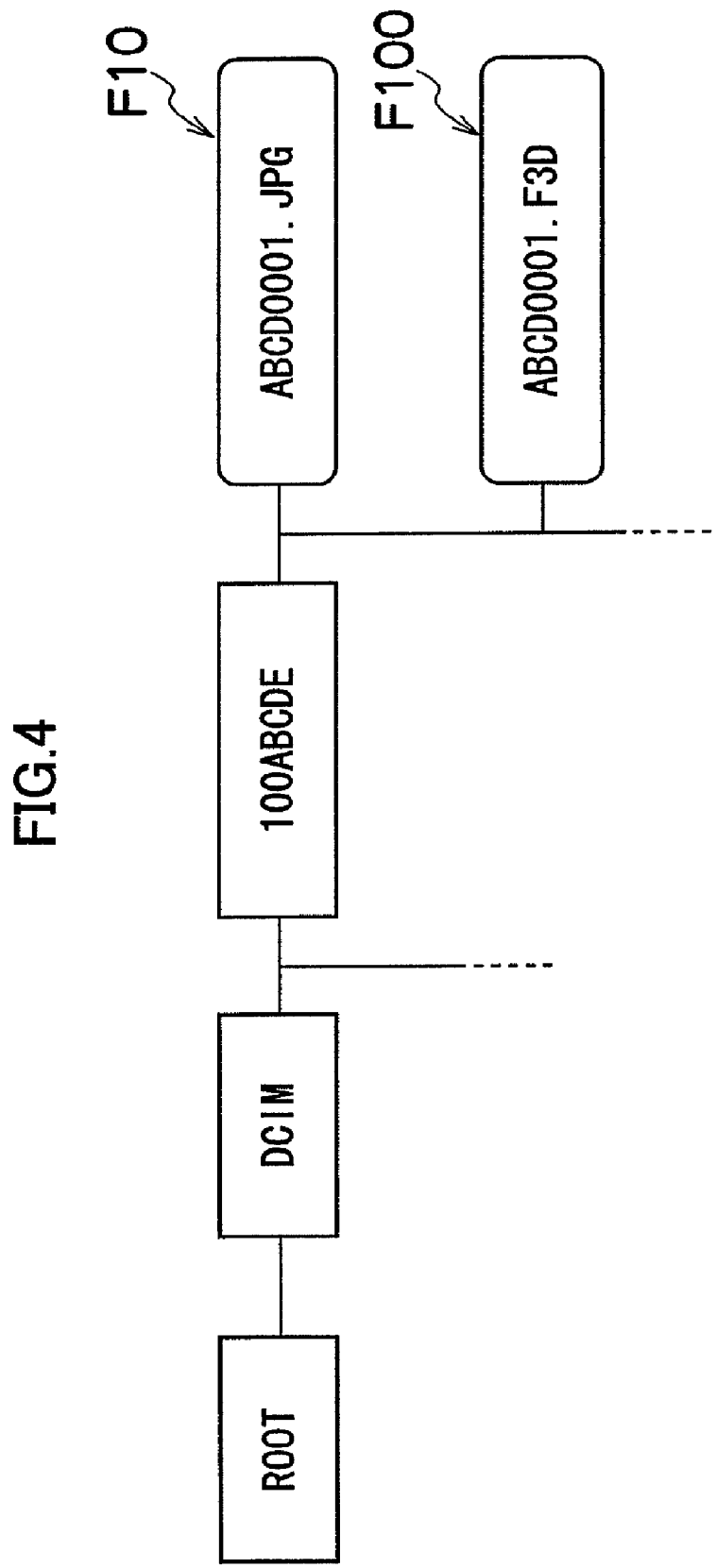
FIG. 4 is a diagram schematically showing the tree structure of a folder where the basic file and the extended image file are stored in a memory card 70.

Now, the structure of the recording image data according to the first embodiment of the present invention will be described. FIG. 2 is a diagram schematically showing the data structure of the basic file F10, and FIG. 3 is a diagram schematically showing the data structure of the extended image file F100. FIG. 4 is a diagram schematically showing the tree structure of a folder where the basic file and the extended image file are stored in the memory card 70.

As shown in FIG. 4, the basic file F10 and the extended image file F100 are stored in the same folder in the memory card 70. The extension for the extended image file F100 is F3D. The extension for the basic file F10 is an extension for standard image files (an extension corresponding to the encoding format of image data stored in the basic file F10). Therefore, even in an image processing apparatus having no function of reading a plurality of pieces of image data from an image file in which a plurality of pieces of image data are stored and performing processing such as reproducing, the basic file F10 can be recognized as an image file in the standard JPEG format, and then be reproduced and edited.

Although the image data in the basic file F10 is in the JPEG format in this embodiment, it may be in other formats (e.g., a TIFF format, bitmap (BMP) format, GIF format, and PNG format).

The basic file F10 and the extended image file F100 have the same file name. The file name of the basic file F10 and the extended image file F100 is determined according to DCF (Design rule for Camera File system).

As shown in FIG. 3, the extended image file F100 according to this embodiment includes a tag information storage area A100 and an image data storage area A102. SOI (Start of Image) and EOI (End of Image) shown are markers indicating the start and end of data, respectively.

The image data storage area A102 stores compressed pieces of image data (which will be referred to as image data P(1), P(2), ..., P(N) respectively in the following description) obtained by compressing images taken by the above-described imaging units 10-1, 10-2, ..., 10-N into the JPEG format.

The tag information storage area A100 stores basic file related information D10. FIG. 5 is a diagram showing the basic file related information D10. As shown in FIG. 5, the basic file related information D10 stores the viewpoint number of a representative image P(d) (d=3 in the example shown in FIG. 5), and the encoding format and storage order information (the order in which images are stored) of image data from each viewpoint stored in an image data storage area A14 of the basic file F10.

The tag information storage area A100 also stores 3D tag information on the extended image file F100. Here, the 3D tag information is information used to provide stereovision display by combining two or more pieces of the multi-viewpoint image data stored in the image data storage area A104. For example, the 3D tag information includes the number of viewpoints indicating the number of pieces of image data used in providing the stereovision display, information for designating the pieces of image data used in providing the stereovision display, and pointer information for designating the location (the reading start position) in the extended image file F100 where each piece of image data is stored.

The tag information storage area A100 also stores information for specifying the corresponding basic file F10, so that the basic file F10 can be referred to (displayed) when the extended image file F100 is played.

As shown in FIG. 2, the basic file F10 according to this embodiment includes a tag information storage area A10, a representative image data storage area A12, and the image data storage area A14. SOI (Start of Image) and EOI (End of Image) shown are markers indicating the start and end of data, respectively.

Like the image data storage area A102 of the extended image file F100, the image data storage area A14 stores the image data P(1), P(2), ..., P(N).

The representative image data storage area A12 stores representative image data P(d) selected from the image data P(1), P(2), ..., P(N). As the representative image data P(d), the image file generation unit 66 selects, for example, an image whose viewpoint is at or around the middle (i.e., an image taken by the imaging unit 10-d placed around the middle of the multiple viewpoints in taking parallax images). That is, the representative image data P(d) is an image from the middle viewpoint if the number of viewpoints N is an odd number, or an image from a viewpoint around the middle if the number of viewpoints N is an even number. For example, the representative image data is the image data P(3) shot by the imaging unit 10-3 if the number of viewpoints N=5, or the image data P(4) or P(5) shot by the imaging unit 10-4 or 10-5 if the number of viewpoints N=8. Alternatively, image data located around the middle of the image data storage area A104 of the extended image file F100 may be selected as the representative image data P(d). The way of selecting the representative image data is not limited to the above. For example, image data corresponding to the user's dominant eye may be selected as the representative image. Image data from the middle viewpoint, or image data from a viewpoint on the side of the user's dominant eye out of the image data around the middle, may be selected as the representative image. Further, image data taken by a user-preset desired imaging unit may be designated as the representative image, or the user may be allowed to manually designate the representative image.

As shown in FIG. 2, the tag information storage area (APP1 Area) A10 includes Exif identification information, a TIFF header, an IFD0 area (IFD0 Area), and an IFD1 area. The IFD0 area stores Exif IFD (Exif tag information), GPS IFD (GPS measuring information), and 3D IFD (3D tag information). The 3D tag information stores information about the relationship to the extended image file F100, so that the extended image file F100 can be referred to when the basic file F10 is played. Pointer to Exif IFD, Pointer to GPS IFD, and Pointer to 3D IFD in FIG. 2 indicate where the Exif IFD, GPS IFD, and 3D IFD are stored in the tag information storage area A10, respectively.

[Another Example of Recording Image Data]

In this embodiment, depending on settings, a distance image may be stored in the basic file F10 along with the representative image. Also in this embodiment, depending on settings, the encoding format of the image data stored in the image data storage area A14 of the basic file F10 may be different from that of the image data stored in the image data storage area A102 of the extended image file F100.

FIG. 6A is a diagram schematically showing the data structure of the basic file F10, and FIG. 6B is a diagram schematically showing the data structure of the extended image file F100. FIG. 7 is a diagram showing the basic file related information D10 in the example of FIG. 6.

The basic file F10 shown in FIG. 6A includes a distance image data storage area A16. From a predetermined one of images taken by the above-described imaging units 10-1, 10-2, ..., 10-N, the image file generation unit 66 generates distance image data $P_D$ indicating information on the distance from the image taking apparatus 1 to a subject in the image, and stores the distance image data $P_D$ in the distance image data storage area A16. The distance image data $P_D$ represents the subject distance information, for example in terms of changes in the pixel color (e.g., changes to red, orange, yellow, yellow-green, green, blue, and violet with the increase in the subject distance) or in terms of the color density (e.g., grayscale). Therefore, the user can visually recognize the subject distance information. The subject distance information may also be stored in formats other than the distance image data $P_D$ (e.g., a data format that stores the value of the subject distance information for each pixel or for each area resulting from dividing the representative image data P(d)). As shown in FIG. 7, the image file generation unit 66 records the viewpoint number of the image data used to generate the distance image as the basic file related information D10 in the extended image file F100.

In the example shown in FIG. 6B, the image file generation unit 66 stores raw image data taken by the above-described imaging units 10-1, 10-2, . . . , 10-N ($P_{RAW}(1)$, $P_{RAW}(2)$, . . . , $P_{RAW}(N)$, respectively) in the image data storage area A102 of the extended image file F100. The image file generation unit 66 also compresses the images taken by the above-described imaging units 10-1, 10-2, . . . , 10-N into a standard encoding format (e.g., the JPEG format) (image data P(1), P(2), . . . , P(N), respectively) and stores the compressed image data in the image data storage area A14 of the basic file F10.

The distance image stored in the basic file F10 may be stored in the extended image file F100 as well.

Although the same encoding format is used for the pieces of image data in the basic file F10 in this embodiment, different encoding formats may be used for different pieces of image data.

The basic file F10 may store pieces of image data from all viewpoints or may store only those from preset viewpoints. If pieces of image data from a plurality of viewpoints are stored in the basic file F10, three-dimensional display may be provided using the basic file F10.

[Processing of Generating Basic File]

Now, processing performed if the basic file F10 is deleted from the folder or modified (edited) will be described.

At predetermined times (e.g., at power-on, when the extended image file F100 is referred to, when the folder storing the extended image file F100 is referred to, when the memory card 70 is attached, or when a folder storing image files in the memory card 70 is updated), the image file generation unit 66 determines whether or not the basic file F10 has been deleted from the folder or modified. If the basic file F10 has been deleted from the folder or modified, the image file generation unit 66 generates (recovers) the basic file F10 by extracting image data necessary for recovering the basic file from the extended image file F100. In the case where the basic file F10 has been modified, the modified basic file is saved as an image file different from the recovered basic file.

In this embodiment, information for specifying the modified basic file may be stored in the extended image file F100 or in the recovered basic file so that the modified basic file can be referred to when the extended image file F100 is reproduced. Also, information for specifying the extended image file F100 or the recovered basic file may be stored in the modified basic file so that the recovered basic file or the extended image file F100 can be referred to when the modified basic file is reproduced.

If the basic file F10 has been deleted from the folder, the file name (except the extension) of the recovered basic file F10 will be the same as that of the extended image file F100. On the other hand, if the basic file F10 has been modified, the image file generation unit 66 determines the file name of the basic file F IO and the extended image file F100 according to a file name changing processing rule (1) or (2) to be described below.

Figure 8:
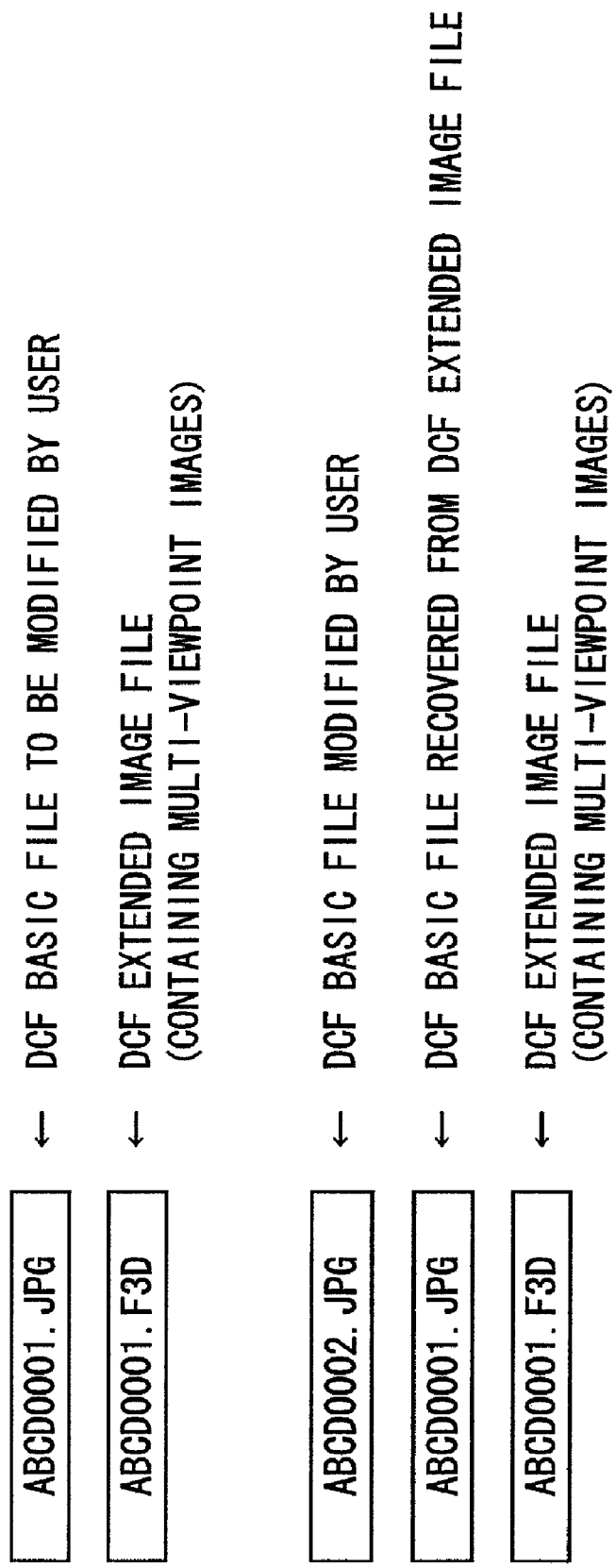
FIG. 8 is a diagram for illustrating a file name changing processing rule (1)

FIG. 8 is a diagram for illustrating the file name changing processing rule (1). As shown in FIG. 8, if the file name of the basic file modified by the user is "ABCD0001.JPG" and the file name of the extended image file corresponding to the basic file "ABCD0001.JPG" is "ABCD0001.F3D", the file name of the modified basic file is changed according to DCF. Here, the file name of the basic file recovered by the image file generation unit 66 will be "ABCD0001.JPG", the same as that of the extended image file except for the extension.

Figure 9:
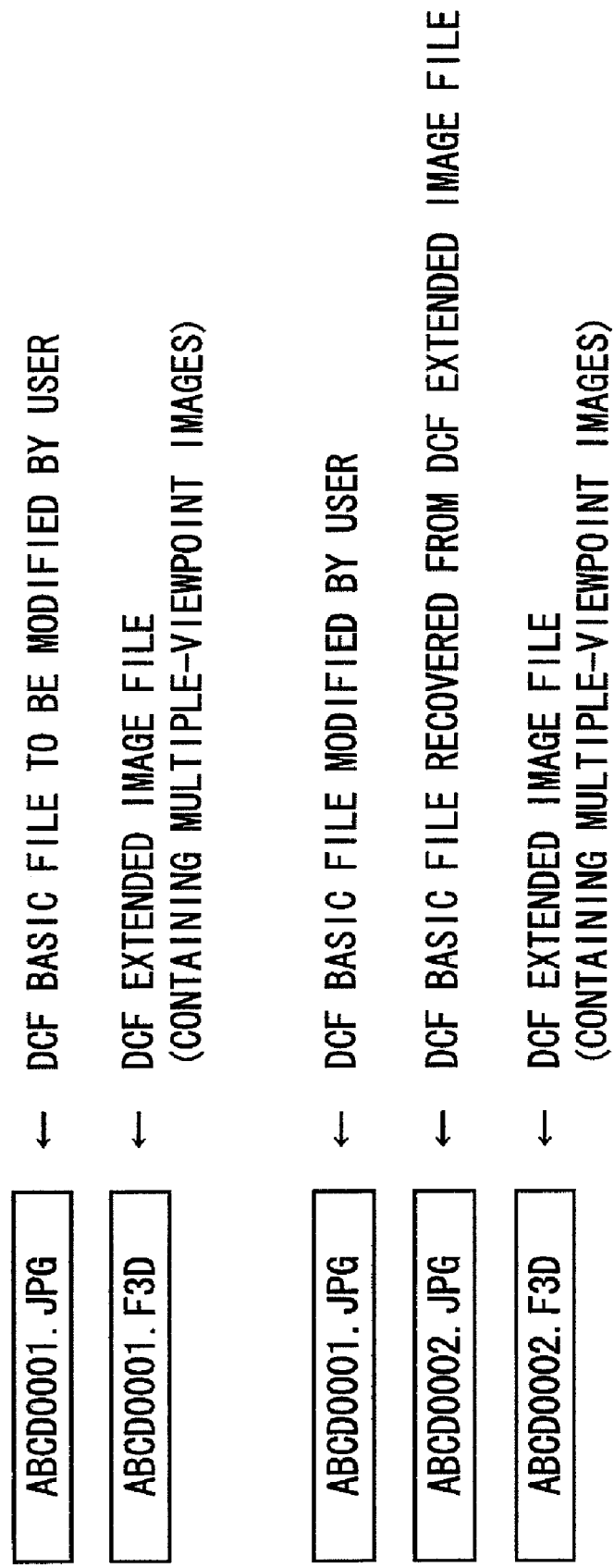
FIG. 9 is a diagram for illustrating a file name changing processing rule (2)

FIG. 9 is a diagram for illustrating the file name changing processing rule (2). In the example shown in FIG. 9, the file name of the modified basic file is not changed, but the file name of the extended image file is changed according to DCF, and the basic file is recovered. Here, the file name of the recovered basic file will be the same as that of the extended image file except for the extension.

File name changing processing rules other than the above-described (1) and (2) may also be used.

Now, the way of determining whether or not the basic file F10 has been modified will be described. When images are taken and recorded, the image file generation unit 66 records the data size or hash value of the basic file F10 or of the representative image data P(d), or timestamp information on the basic file F10, as header information on the extended image file F100. Then, the image file generation unit 66 obtains the data size or hash value of the basic file F10 or of the representative image data P(d), or timestamp information on the basic file F10, from the basic file F10, and compares this information with the tag information on the extended image file F100. If they do not match, it is determined that the basic file F10 has been modified.

The determination of whether or not the basic file F10 has been deleted or modified may be performed for all extended image files F100 by automatically scanning the extended image files in the folder in the memory card 70, for example when the image taking apparatus 1 is powered on or when the operation mode is switched (e.g., from the shooting mode to the reproducing mode). Alternatively, the determination may be performed for only a relevant extended image file F100 each time a reproducing operation or preview operation on an extended image file F100 is performed in the image taking apparatus 1.

Figure 10:
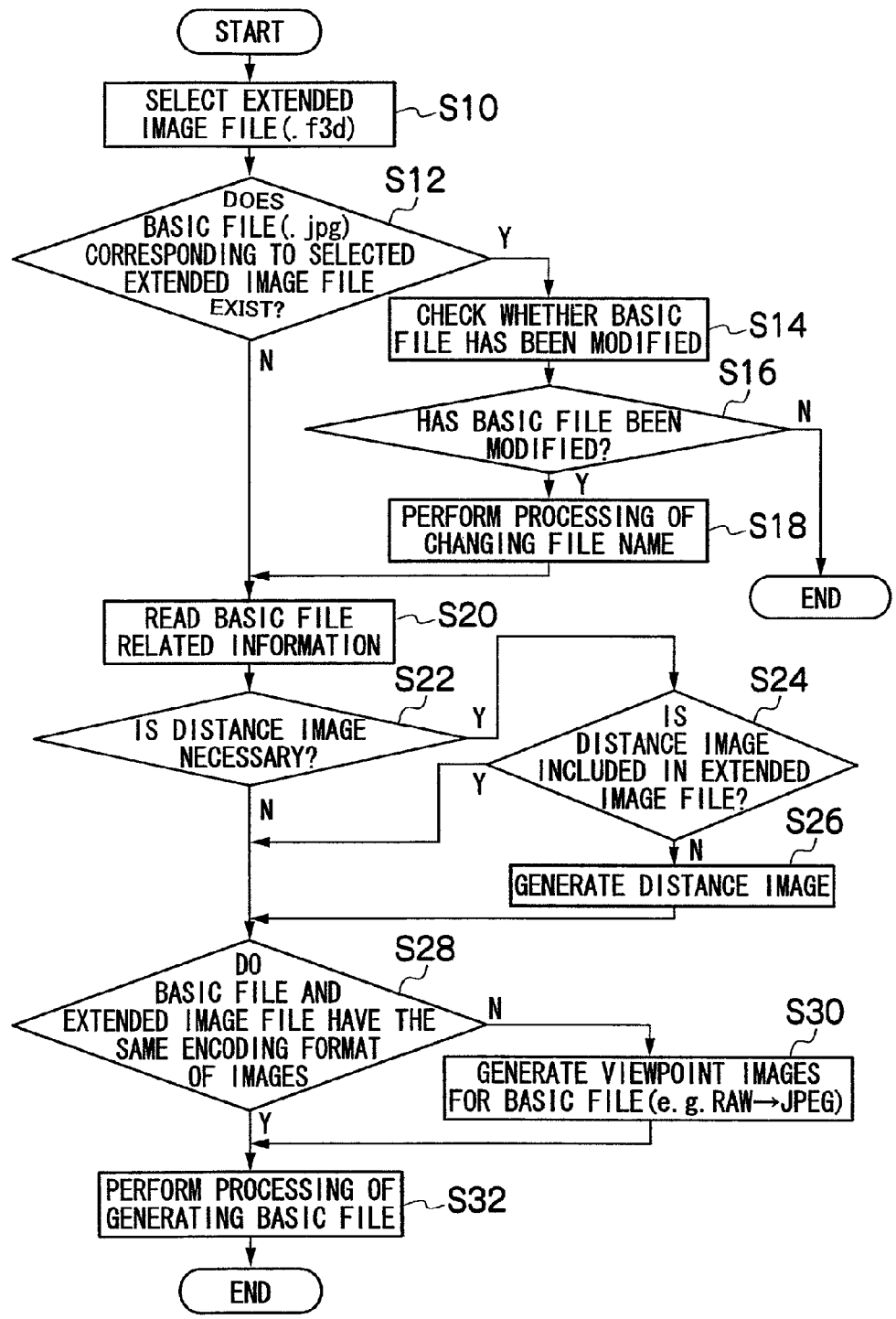
FIG. 10 is a flowchart showing the processing of recovering the basic file F10.

FIG. 10 is a flowchart showing the processing of recovering the basic file F10. First, an extended image file F100 is selected (step S10), and it is determined whether a basic file F10 corresponding to this extended image file F100 exists (step S12). If a basic file F10 corresponding to this extended image file F100 exists in step S12, it is checked whether or not the basic file F10 has been modified (step S14). If it is determined that the basic file F10 has been modified (Yes in step S16), one of the file name of the modified basic file F10 and the file name of the extended image file F100 is changed according to the above-described file name changing rules (step S18), and the processing proceeds to step S20. If it is determined that the basic file F10 has not been modified (No in step S16), the processing terminates.

If a basic file F10 corresponding to the extended image file F100 does not exist (i.e., has been deleted) in step S12, the processing proceeds to step S20.

Next, the basic file related information D10 (see FIGS. 5 and 7) is read from the extended image file F100 (step S20). It is determined whether a distance image is included in the modified or deleted basic file F10, that is, whether a distance image of the basic file F10 is necessary (step S22). If it is determined in step S22 that a distance image is necessary, it is determined whether the necessary distance image is included in the extended image file F100 (step S24). If the necessary distance image is not included in the extended image file F100 (No in step S24), the viewpoint number of image data used to generate the distance image is read from the basic file related information D10 in the extended image file F100 to generate the distance image from the image data corresponding to that viewpoint number (step S26). If the necessary distance image is included in the extended image file F100 (Yes in step S24), the distance image is used to perform processing of recovering the basic file F10.

Next, the encoding format of image data from each viewpoint to be stored in the image data storage area A14 of the basic file F10 is read from the basic file related information D10 in the extended image file F100. It is determined whether the encoding format of the image data to be stored in the basic file F10 is the same as that in the extended image file F100 (step S28). If the encoding format of the image data to be stored in the basic file F10 is different from that in the extended image file F100 in step S28, the image data in the extended image file F100 is converted into the encoding format recorded in the basic file related information D10 to generate image data for the basic file F10 (step S30). The image data for the basic file F10 generated in step S30 is used to generate the basic file F10 (step S32).

If the encoding format of the image data to be stored in the basic file F10 is the same as that in the extended image file F100 in step S28, the image data in the extended image file F100 is read to generate the basic file F10 (step S32).

In step 32, the distance image data is stored in the basic file F10 as necessary.

According to this embodiment, images can be recorded in the basic file F10 that is in a format readable even in an image processing apparatus having no function of reading a plurality of pieces of image data from the extended image file F100 in which a plurality of concatenated pieces of image data are stored and playing or editing the read pieces of image data. Further, according to this embodiment, the basic file F10 can be recovered if, for example, the basic file F10 has been deleted from the folder in which the extended image file F100 is stored, or has been modified and saved by overwrite. The basic file F10 can also be recovered if, for example, in an image processing apparatus different from the image taking apparatus 1, the basic file F10 has been deleted from the folder in which the extended image file F100 is stored in the memory card 70, or has been modified and saved by overwrite, and the memory card 70 is returned to the image taking apparatus 1. Therefore, unmodified representative image data can always be provided to other image processing apparatuses.

In this embodiment, the extended image file F100 and the basic file F10 are recorded in the same memory card. However, in an image recording apparatus having a plurality of recording media, for example, the extended image file F100 and the basic file F10 may be recorded in separate recording media. Also, at least one of the extended image file F100 and the basic file F10 may be transmitted to an external image processing apparatus via the external connection I/F 72 or a communication line and recorded.

Second Embodiment

Now, a second embodiment of the present invention will be described. FIG. 11 is a block diagram showing the general configuration of the image recording apparatus according to the second embodiment of the present invention. In this embodiment, the image recording apparatus 100 is implemented as a personal computer (PC), for example, and it is an apparatus for reading recording image data from an image taking apparatus or the memory card 70, saving and editing the recording image data, and so on. As shown in FIG. 11, a central processing unit (CPU) 102 is connected to each block in the image recording apparatus 100 via a bus 104 to control the operation of each block. A main memory 106 includes a storage area in which a control program is stored, and a work area used in executing the program. A hard disk device 108 stores an operating system (OS) for the image recording apparatus 100, various kinds of application software, recording image data (the basic file F10 and the extended image file f100) read from the image taking apparatus 1 or the memory card 70, and so on. A CD-ROM device 110 reads data from a CD-ROM (not shown). A card interface unit (card I/F) 112 reads image data from the memory card 70. A display memory 116 temporarily stores display data. A monitor 118 is implemented as a CRT (Cathode Ray Tube) monitor or a liquid crystal monitor, for example, and displays images, text, and so on based on image data, text data, and so on output from the display memory 116. A keyboard 120 and a mouse 122 receive an operational input from an operator and input a signal corresponding to the operation input to the CPU 102. Besides the mouse 122, available pointing devices include a touch panel and a touch pad. A mouse controller 124 detects the state of the mouse 122 and outputs a signal to the CPU 102 indicating the position of a mouse pointer on the monitor 118, the state of the mouse 122, and so on. A microphone 128 and a speaker 130 are connected to an audio I/O circuit 126, so that the audio I/O circuit 126 receives inputs of various sound signals, and outputs and plays various operational sounds according to operational inputs from the keyboard 120 and so on. A communication interface unit (communication I/F) 132 communicates with a network NW. A camera connection interface unit (camera connection I/F) 134 transmits/receives data to/from the image taking apparatus (electronic camera or digital camera) 1.

In this embodiment, the CPU 102 performs the processing shown in FIG. 10 above, for example at power-on, when the extended image file F100 is referred to, when the folder storing the extended image file F100 is referred to, when the memory card 70 is attached, or when a folder storing image files in the hard disk device 108 is updated. In this manner, the basic file F10 can be recovered in the image recording apparatus 100 according to this embodiment. Therefore, unmodified representative image data can always be provided to other image processing apparatuses.

In the above-described embodiments, if an instruction is input to store data in an image recording device such as the memory card 70 or the hard disk device 108 with a small amount of space remaining, for example, the basic file F10 may be deleted to increase the remaining space and afterward automatically recovered when more space becomes available in the image recording device.

The present invention may also be provided as a program applicable to image recording apparatuses, for example, an image taking apparatus, personal computer, mobile information terminal, and image storage device.

What is claimed is:

1. An image recording apparatus comprising:
   an image recording device which records an extended image file storing a plurality of pieces of image data and a basic file storing at least one piece of image data selected from the plurality of pieces of image data stored in the extended image file, the extended image file and the basic file being associated with each other;

a determination device which determines whether or not the basic file has been deleted or modified; and a basic file recovery device which recovers the basic file from the extended image file if it is determined that the basic file has been deleted or modified, wherein the image recording device records a plurality of pieces of image data taken from multiple viewpoints in the extended image file and records a piece of representative image data selected from the plurality of pieces of image data in the basic file, and the basic file recovery device recovers the piece of representative image data to be stored in the basic file by extracting the piece of representative image data, viewpoint number of the piece of representative image data being stored in basic file related information in the extended image file, among the plurality of pieces of image data stored in the extended image file.

2. The image recording apparatus according to claim 1, wherein the image recording device records the basic file with a standard image-file extension attached to the basic file.

3. The image recording apparatus according to claim 1, wherein the image recording device records basic file related information necessary for recovering the basic file in the extended image file, and the basic file recovery device recovers the basic file according to the basic file related information.

4. The image recording apparatus according to claim 2, wherein the image recording device records basic file related information necessary for recovering the basic file in the extended image file, and the basic file recovery device recovers the basic file according to the basic file related information.

5. An image recording apparatus comprising:

an image recording device which records an extended image file storing a plurality of pieces of image data and a basic file storing at least one piece of image data selected from the plurality of pieces of image data stored in the extended image file, the extended image file and the basic file being associated with each other;

a determination device which determines whether or not the basic file has been deleted or modified; and a basic file recovery device which recovers the basic file from the extended image file if it is determined that the basic file has been deleted or modified, wherein the image recording device records basic file related information necessary for recovering the basic file in the extended image file, the basic file recovery device recovers the basic file according to the basic file related information, the image recording device records raw data of the plurality of pieces of image data in the extended image file, and the basic file recovery device recovers plurality of pieces of image data to be stored in the basic file by encoding pieces of raw data designated in the basic file related information, among the pieces of raw data stored in the extended image file, into an encoding format specified in the basic file related information.

6. An image recording method comprising:

an image recording step of recording an extended image file storing a plurality of pieces of image data and a basic file storing at least one piece of image data selected from the plurality of pieces of image data stored in the extended image file, the extended image file and the basic file being associated with each other;

a determination step of determining whether or not the basic file has been deleted or modified; and a basic file recovery step of recovering the basic file from the extended image file if it is determined that the basic file has been deleted or modified, wherein in the image recording step, a plurality of pieces of image data taken from multiple viewpoints are recorded in the extended image file, and a piece of representative image data selected from the plurality of pieces of image data is recorded in the basic file, and in the basic file recovery step, the piece of representative image data to be stored in the basic file is recovered by extracting the piece of representative image data, viewpoint number of the piece of representative image data being stored in basic file related information in the extended image file, among the plurality of pieces of image data stored in the extended image file.

7. The image recording method according to claim 6, wherein in the image recording step, the basic file is recorded with a standard image-file extension attached to the basic file.

8. The image recording method according to claim 6, further comprising the steps of:

recording basic file related information necessary for recovering the basic file in the extended image file; and recovering the basic file according to the basic file related information.

9. The image recording method according to claim 7, further comprising the steps of:

recording basic file related information necessary for recovering the basic file in the extended image file; and recovering the basic file according to the basic file related information.

10. An image recording method comprising:

an image recording step of recording an extended image file storing a plurality of pieces of image data and a basic file storing at least one piece of image data selected from the plurality of pieces of image data stored in the extended image file, the extended image file and the basic file being associated with each other;

recording basic file related information necessary for recovering the basic file in the extended image file;

a determination step of determining whether or not the basic file has been deleted or modified; and a basic file recovery step of recovering the basic file from the extended image file if it is determined that the basic file has been deleted or modified, according to the basic file related information, wherein in the image recording step, raw data of the plurality of pieces of image data are recorded in the extended image file, and the basic file recovery step comprises the step of recovering plurality of pieces of image data to be stored in the basic file by encoding pieces of raw data designated in the basic file related information, among the pieces of raw data stored in the extended image file, into an encoding format specified in the basic file related information.

11. The image recording apparatus according to claim 5, wherein the image recording device records the basic file with a standard image-file extension attached to the basic file.

12. The image recording method according to claim 10, wherein in the image recording step, the basic file is recorded with a standard image-file extension attached to the basic file.

* * * * *